April 10, 1928.
F. A. CARMONA ET AL
LIQUID LEVEL INDICATOR
Filed Nov. 15, 1921  2 Sheets-Sheet 2
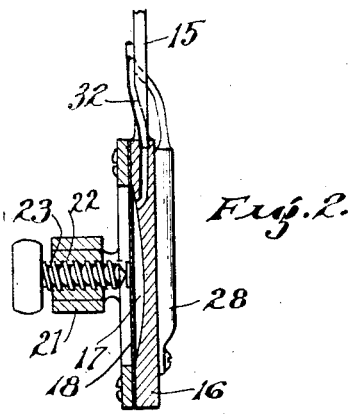
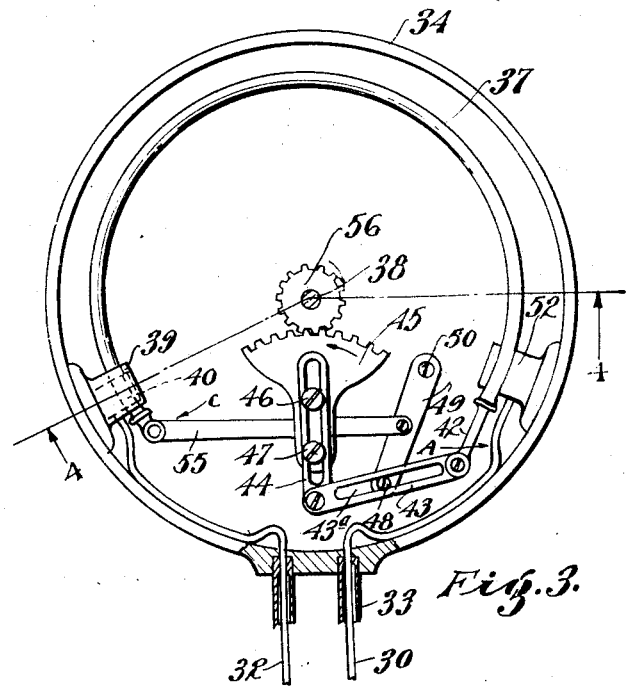
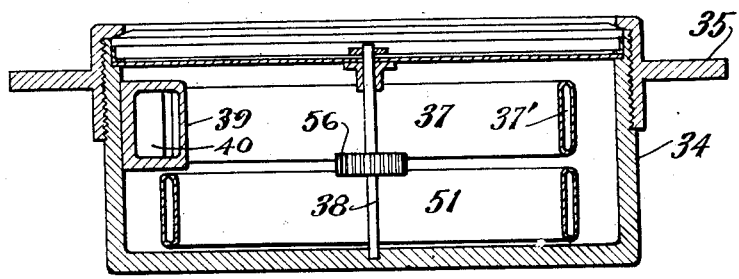
INVENTOR
FREDERICK A. CARMONA
ALFRED M. SANDS
BY E. Leo E. Townsend
ATTY.

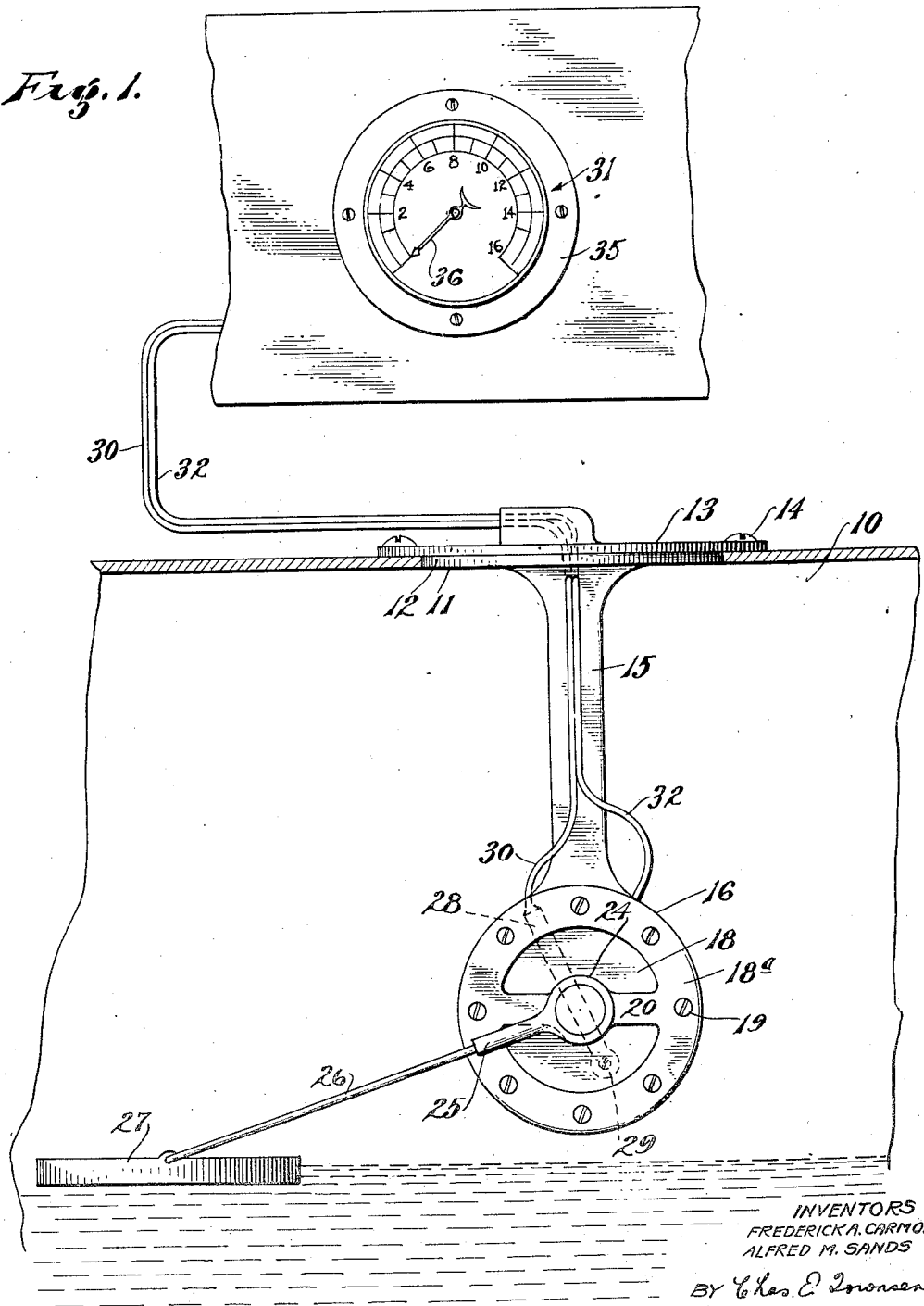

Patented Apr. 10, 1928.

1,665,530

UNITED STATES PATENT OFFICE.

FREDERICK A. CARMONA AND ALFRED M. SANDS, OF BERKELEY, CALIFORNIA, ASSIGNORS TO CARMONA-SANDS CORPORATION, OF SAN FRANCISCO, CALIFORNIA, A CORPORATION OF CALIFORNIA.

LIQUID-LEVEL INDICATOR.

Application filed November 15, 1921. Serial No. 515,208.

This invention relates to measuring and indicating devices and particularly pertains to certain new and useful improvements in liquid level gauges.

It is the object of the present invention to provide pressure actuated means for measuring and indicating the volume of a body of liquid at a remote point, the apparatus being provided with means for automatically compensating for the effect of temperature variations, said apparatus being particularly applicable for use in connection with automobile fuel tanks to ascertain the amount of fuel therein and visibly indicate the measured amount upon a calibrated indicator.

The present invention contemplates the use of an indicating member passing over a dial and which is operated through the medium of pressure and thermostat means for indicating the volume of a liquid and to correct the inaccuracies in the reading due to variations in temperature.

One form which our invention may assume is exemplified in the following description and illustrated by way of example in the accompanying drawings, in which:

Figure 1 is a view showing the measuring device and the indicating mechanism connected therewith.

Fig. 2 is a section through the measuring device.

Fig. 3 is a view in section and elevation through the indicator disclosing its operating mechanism.

Fig. 4 is a section through the indicator taken on line 4—4 of Fig. 3.

Referring more particularly to the drawings, 10 indicates a liquid reservoir. This reservoir is preferably formed with an aperture 11 of a size to receive and seat the lower reduced portion 12 of a cover member 13. This cover member is firmly secured to the reservoir by means of screws, 14. Extending downwardly from the cover is a shank 15 which terminates in a disc shaped head 16. One face of the head is concaved as shown in Fig. 2, thus forming a chamber 17. The outer wall of this chamber is formed by a flexible diaphragm 18 which agrees in diameter with that of the head 16 and is secured thereto by means of the annular flange member 18ª. This latter member is positioned on the exterior side of the diaphragm and is secured to the head 16 by screws 19. Formed integral with the flange member 18ª are the arms 20 which support a central boss 21. Secured within this boss is a bushing 22. Threaded through the bushing 22 is a threaded stud 23 having one end tapered to abut against the diaphragm and the other end operating in the fitting 24. This fitting has a sleeve member 25 formed integral therewith and adapted to receive the end of a float lever 26, the float lever having a float 27 pivotally connected to and depending from its free end. This float is intended to rest upon the surface of the liquid, and has sufficient buoyancy to swing the lever 26 when the volume of the liquid to be measured is changed. Upon such swinging movement of the lever 26 the threaded stud 23 will be partially rotated and accordingly will advance or retract in relation to the diaphragm as the lever moves upwardly or downwardly.

Mounted on and secured to the other face of the head is a tubular member 28. This member has a flattened end 29 secured in any suitable manner to the head 16. The other end of the member 28 is connected to a transmission tube 30.

It should be stated that both the hollow cylindrical member 28 and the chamber 17 are adapted to contain incompressible fluid such as oil or water. The capacity of both of these chambers preferably being equal while both tubes are in communication with an indicating device 31. This indicator is preferably mounted on the dashboard of an automobile and will be hereinafter more fully described.

The transmission tubes 30 and 32 may be insulated from the surrounding atmosphere by jackets 33 which are of sufficient diameter to form an air chamber enclosing the tubes.

The indicating device 31 comprises a cylindrical formed casing 34 which may be mounted on the dashboard of an automobile and supported in relation thereto by the flange 35. The casing 34 encloses a mechanism for actuating a pointer 36. This pointer is mounted on a spindle 38 and is adapted to swing over the face of the dial of the indicator. This dial is calibrated with reference to the measuring mechanism in a manner to translate the movement of the float 27 into readings indicating the relative quantities of liquid in the reservoir 10.

The spindle 38 is indirectly operated by an arcuate expansion element 37. This element represents a partial convolution and as shown in Fig. 4 is formed with a narrow rectangular passageway 37'. The expansion element 37 has one open end which is secured within the fitting 39 disposed on the wall of the casing 34. The fitting 39 has an interior chamber 40 in communication with the transmission tube 32. The other end of the expansion element 37 is closed and when pressure is applied to the incompressible fluid within the tube 32, the tendency will be to act upon the element 37 and cause it to straighten or swing its free end outwardly in the direction of the arrow "A."

The free end of the expansion element 37 is formed with a lug 42, pivotally connected to a link 43. This link in turn is connected to one end of a lever 44, the latter being slidably mounted on the segmental gear 45 and provided with a slot which is engaged by projecting screws 46 and 47. The screw 47 also serves as a pivot pin about which the segment swings. The link 43 is also formed with a slot 43ᵃ in which is disposed a pin 48. This pin is secured to the free end of lever 49 which is pivotally mounted within the casing as at 50.

Referring to Fig. 4, it will be seen that a second expansion element 51 is provided. This element is similar in shape and size to the element 37 and preferably has a like capacity. The element 51 is provided to compensate for the effects of temperature changes on the tube 37 and the fluid therein and to correct inaccuracies liable to occur in the indicator readings.

The compensating expansion element 51 has its open end secured within a fitting 52, the latter being positioned and secured to the side of the casing opposite on which the fitting 39 is mounted.

The fitting 52 is also provided with a chamber in communication with the expansion element 51 and transmission tube 30. The chamber in the fitting 52 is identical in construction with the chamber 40 shown in Figure 4.

When the pressure rises in the expansion element 51 due to increases in temperature, its free end will swing in the direction indicated by the arrow "C" which direction is opposite that taken by the other expansion element 37.

The free end of the compensating expansion member is also closed and is provided with a lug similar to the lug 42 heretofore described and pivotally connected to a link 55. This link exerts a pull on the pivotal lever 49 when the tube 51 expands and tends to swing the lever and to accordingly raise the link 43. This rising movement is also imparted to the slidable lever 44, thus varying the movement which may be imparted to the segment by a given action of the member 37.

In operation of the present invention, the apparatus will be assembled as shown in Fig. 1 and the float will rest on the surface of the liquid in the reservoir. The position of the float will determine the pressure exerted on the diaphragm by the member 23. This pressure will be accordingly imparted to the incompressible fluid within the chamber 17 and will be transmitted through the transmission tube 32 to the expansion member 37. A proportionate swinging movement of the free end of the expansion member 37 will take place to swing the gear segment and rotate the gear pinion 56. Rotation of the pinion 56 will similarly affect the spindle 38 and accordingly operate the hand or pointer to indicate the amount of liquid measured in the reservoir.

When changes in temperature occur, inaccuracy would naturally occur in the reading of the indicator.

As before stated the chamber within the member 28 and the compensating expansion member 51 preferably contain an amount of fluid equal in volume to that contained in the chamber 17 and the expansion member 37. Therefore, it is obvious that both bodies of fluid will expand equally during changes in temperature.

When excessive expansion of the member 37 takes place due to temperature variation, the reading indicated on the dial of the indicator would be inaccurate. This inaccuracy is automatically corrected as the expansion member 51 will distend to a degree equal to the excessive amount of expansion of the liquid in tube 37. The distension of the element 51 will act to correct the reading of the indicator by exerting a pull on the link 55 which in turn imparts movement to the lever 49. This lever in turn raises the link 43, thus retarding the movement of the segment and the pointer so that the latter will indicate the correct reading.

If the amount of liquid in the tank remains unchanged and a rise in temperature causes expansion of the incompressible bodies of fluid, the result would be that the segment would remain stationary, as all the swinging movement of both of the expansion elements would be absorbed in the link mechanism. In other words the link 43 would be simultaneously drawn outwardly and raised upwardly and the only effect which would result therefrom would be the moving of the sliding lever.

From the foregoing description it is obvious that the apparatus here disclosed is practical and efficient and one which eliminates the use of thermostatic coils and the like while automatically compensating for inaccuracies which may result from the effects of temperature variation during the measuring operation. It will be understood that the term "thermostatic influenced fluid" comprehends a fluid which expands and contracts under the influence of temperature changes.

Having disclosed our invention in the form as now known to us, it will be understood that various changes in the combination, construction, and arrangement of parts might be made by those skilled in the art without departing from the spirit of the invention as claimed.

Having thus described our invention, what we claim and desire to secure by Letters Patent, is:

1. In a liquid level indicator for reservoirs, a pressure indicator, an expansion member having a fluid pressure passage extending to the reservoir, and said expansion member and passage containing a fluid, a float mounted to move upwardly and downwardly with the level of the liquid within the reservoir to vary the pressure in the expansion member to operate the indicator, a second expansion member, having a fluid pressure passage extending to the reservoir and containing a fluid affected by temperature changes only, and connected with the said pressure indicator to compensate for temperature variations in the first named expansion member.

2. A liquid level indicator for reservoirs comprising a pair of tubular spiral expansion members containing a fluid and each having a fluid pressure passage extending to the reservoir, an indicating hand, mechanism for connecting the indicating hand with one of the expansion members, a float mounted to move upwardly and downwardly with the level of the liquid within the reservoir to vary the pressure of the fluid in one expansion member with the rise and fall of the liquid in the reservoir, the other expansion member and pressure passage being affected only by temperature variations and said other expansion member being connected with said mechanism to compensate for temperature variations in the first named expansion member.

3. A liquid level indicator for reservoirs, comprising a casing, a calibrated dial therefor, a pair of tubular spiral expansion members arranged within the casing and operating in opposite directions and containing a fluid and each having a fluid pressure passage extending to the reservoir, an indicating hand mounted adjacent the dial, mechanism for connecting the indicating hand with one of the expansion members, a float mounted to move upwardly and downwardly with the level of the liquid within the reservoir to vary the pressure of the liquid in one expansion member with the rise and fall of the liquid in the reservoir, the other expansion member and pressure passage being affected only by temperature variations and said other expansion member being connected with said mechanism to compensate for temperature variations in the first mentioned expansion member.

4. In a liquid level indicator for reservoirs, a pressure indicator, a chamber having a movable diaphragm, an expansion member having a fluid pressure passage extending to the reservoir and communicating with the said chamber, and said expansion member, passage and chamber containing a fluid, a float mounted to move upwardly and downwardly with the level of the liquid within the reservoir to actuate the diaphragm to vary the pressure in the expansion member to operate the indicator, a second expansion member having a fluid pressure passage extending to the reservoir and containing a fluid affected by temperature changes only, and connected with the said pressure indicator to compensate for temperature variations in the first named expansion member.

5. In a liquid level indicator for reservoirs, a pressure indicator, a pair of chambers, a movable diaphragm forming one wall of one of the chambers, an expansion member having a fluid pressure passage extending to the reservoir and communicating with the chamber having the said diaphragm, and said expansion member, passage and chamber containing a fluid, a float mounted to move upwardly and downwardly with the level of the liquid within the reservoir to actuate the diaphragm to vary the pressure in the expansion member to operate the indicator, a second expansion member having a fluid pressure passage extending to the reservoir and communicating with the other of said pair of chambers, said other chamber and the fluid passage of the second expansion member containing a fluid affected by temperature changes only, the second expansion member being connected with the said pressure indicator to compensate for temperature variations in the first named expansion member.

FREDERICK A. CARMONA.
ALFRED M. SANDS.